United States Patent [19]
Paff

[11] Patent Number: 5,425,057
[45] Date of Patent: Jun. 13, 1995

[54] PHASE DEMODULATION METHOD AND APPARATUS USING ASYNCHRONOUS SAMPLING PULSES

[76] Inventor: Thomas M. Paff, 24771 Summer Hill Ave., Los Altos, Calif. 94024

[21] Appl. No.: 232,701

[22] Filed: Apr. 25, 1994

[51] Int. Cl.⁶ .......................................... H04L 27/22
[52] U.S. Cl. .................................... 375/326; 375/235; 375/329; 329/304
[58] Field of Search ...................... 375/106, 97, 11, 12, 375/63, 83, 86, 39, 53, 15, 16, 81, 14, 119, 120, 80; 329/304

[56] References Cited

U.S. PATENT DOCUMENTS

| | | | |
|---|---|---|---|
| 4,180,779 | 12/1979 | Hook et al. | 329/50 |
| 4,344,178 | 8/1982 | Waters | 375/81 |
| 4,414,675 | 11/1983 | Comroe | 375/90 |
| 4,501,002 | 2/1985 | Auchterlonie | 375/86 |
| 4,538,111 | 8/1985 | Giusto | 375/86 |
| 4,606,051 | 8/1986 | Crabtree et al. | 375/86 |
| 4,612,518 | 9/1986 | Gans et al. | 332/21 |
| 4,773,083 | 9/1988 | Baumbach et al. | 375/308 |
| 4,800,573 | 1/1989 | Cubo | 375/14 |
| 4,814,719 | 5/1989 | Guyer | 329/124 |
| 4,833,416 | 5/1989 | Attwood | 329/50 |
| 4,947,409 | 8/1990 | Raith et al. | 375/97 |
| 4,949,357 | 8/1990 | Schier | 375/86 |
| 5,062,123 | 10/1991 | Geile et al. | 375/97 |
| 5,117,195 | 5/1992 | Robbins | 329/307 |
| 5,179,578 | 1/1993 | Ishizu | 375/86 |
| 5,268,647 | 12/1993 | Ichiyoshi | 329/308 |
| 5,311,546 | 5/1994 | Paik et al. | 375/97 |
| 5,311,553 | 5/1994 | Chennakeshu et al. | 375/53 |

OTHER PUBLICATIONS

Near Optimum Timing Recovery for Digitally Implemented Data Receivers, P Farhang-Boroujeny, IEEE Trans. of Com vol. 38 No. 9 Sep. 1990.

Primary Examiner—Stephen Chin
Assistant Examiner—Tesfaldet Bocure

[57] ABSTRACT

A method is presented for efficient VLSI implementation of a narrowband BPSK or QPSK demodulator which minimizes filter processing requirements. The demodulator implements a digital filter which spans a time duration of 8 symbols to realize a square root of raised cosine filter. The disadvantage of a conventional FIR filter, is that it requires a fixed ratio between the input sample rate and the FIR filter output rate. The subject invention employs a unique, flexible digital filter which provides one output per symbol while the input sample rate may vary from a low rate approaching two samples per symbol to over 128 samples per symbol. A key element of this approach is the digital phase locked loop used for symbol tracking which employs a direct digital synthesizer (DDS) as the frequency control element. In addition to providing symbol timing to the accuracy of the sample clock, the DDS also provides a fine measure of symbol timing phase at each sample clock. This high resolution timing phase information provided by the symbol timing NCO is used to select the filter coefficients to be applied at each sample. The resulting implementation is practical for a sample rate approaching 2 samples-per-symbol and can be used with sample rates as high as several hundred samples-per-symbol. The low clock rate permits very low power consumption for a fixed carrier frequency and symbol rate application, or a high clock rate can be used to enable the demodulator to be tuned over a wide range of potential carrier frequencies and symbol rates.

10 Claims, 6 Drawing Sheets

PHASE DEMODULATION METHOD AND APPARATUS USING ASYNCHRONOUS SAMPLING PULSES

FIELD OF INVENTION

The present invention relates to VLSI implementation of a demodulator of phase shift keyed signals used for transmission of digital data. In particular, this invention provides a high degree of flexibility of carrier frequency, symbol rate and the ratio of sample clock frequency to symbol clock frequency. The invention provides the potential for lower power consumption and greater flexibility compared with other existing approaches.

BACKGROUND OF INVENTION

Phase shift keying in the form of BPSK and QPSK have been used for almost as long as there has been a need to transmit digital information. For the most part, PSK demodulators have been implemented in the past with mostly analog technology. Analog technology suffers from a number of limitations. In particular, the matched filter for an analog demodulator must be designed for a specific symbol rate. If a demodulator must process a number of symbol rates, one analog filter for each symbol rate must be included in the demodulator design. Analog techniques can be implemented which permit frequency tuning, but such a design will involve a number of different components and several analog adjustments. Any analog design will be sensitive to normal analog component tolerances as well as component imperfections such as DC bias, spurious components, unwanted bandlimiting effects and imbalance between signal paths which should be closely matched.

In the past few years, semiconductor technology has progressed to the point where many tens or hundreds of thousands of gates can be resident on a single CMOS integrated circuit. This technology has made it practical to implement all of the signal processing algorithms of a PSK demodulator on a single chip. Aside from the cost benefit of such a solution, digital techniques are capable of overcoming all of the above mentioned limitations of analog technology. Low data rate digital demodulators have been implemented using programmable digital signal processing (DSP) devices. A number of demodulator integrated circuits have been developed which permit digital data (such as FAX) to be transmitted over conventional telephone lines.

Recently, satellite technology has been used to broadcast digital information at high rates to a large number of subscribers. In particular, direct broadcast satellites (DBS) will be used to transmit digital television signals to subscribers which utilize a small, low cost terminal. Also planned are services for satellite broadcast of digital CD quality audio. All of these broadcast services require a low cost, digital demodulator capable of demodulating data rates in the range of several hundred kilobits-per-second to several tens of megabits-per-second.

A number of components required of a digital demodulator have been developed and made available commercially. In particular, these consist of a variety of direct digital synthesizers (DDS) products and digital down converters and digital symbol tracking devices. Currently, a number of disclosures have appeared intended to improve the BPSK/QPSK demodulation process.

For example, U.S. Pat. No. 4,344,178 to Waters discloses a decision-directed Costas loop demodulator which operates on a slowly varying error signal rather than on the rapidly varying I and Q channel signals.

U.S. Pat. No. 5,117,195 to Robbins discloses a demodulator for recovering multiphase modulated digital data from an analog carrier which features a shift register that samples the input waveform at a clock rate that is a multiple of the carrier frequency and resolves the digital waveform into two components for the purpose of QPSK analysis.

U.S. Pat. No. 4,180,779 to Hook et al discloses a QPSK demodulator utilizing a bandpass filter separating two doubling units which allow use of heterodyning in order to operate at a lower frequency.

U.S. Pat. No. 5,103,466 to Bazes discloses a clock and data recovery circuit information from phase encoded serial data including a synchronous delay line.

U.S. Pat. No. 4,606,051 to Crabtree et al discloses a modem receiver including FIR filters which perform quadrature detection U.S. Pat. No. 4,612,518 to Gans et al discloses a QPSK modulator or demodulator using a carrier frequency which is a subharmonic of a predetermined microwave carder frequency.

U.S. Pat. No. 4,501,002 to Auchterlonie discloses an offset QPSK demodulator which samples inphase and quadraphase channels and derives carder phase and clock phase signals even if the samples are hard limited.

U.S. Pat. No. 4,414,675 to Comroe discloses a demodulator with a limiter for amplitude limiting the data signal and a microcomputer for having an interrupt routine which extracts the clock offset to provide an estimate of the relative location of the bit boundaries.

U.S. Pat. No. 5,179,578 to Ishizu discloses a demodulator including a $\pi/4$ phase shift circuit in a conventional QPSK Costas loop to alternately rotate the phase of an inputted QPSK signal.

U.S. Pat. No. 5,268,647 to Ichiyoshi discloses a method and apparatus for coherently demodulating PSK signals using a feedback loop including a filter bank.

U.S. Pat. No. 4,773,083 to Baumbach et al discloses a demodulator for QPSK including one optimizer which adjusts the phase of a reference signal used for modulating the QPSK into baseband in-phase and quadrature channel components and another optimizer which adjusts a sampling clock used to sample and quantize the baseband channels.

U.S. Pat. No. 4,814,719 to Guyer discloses a demodulator in which the amplitudes of the I and Q signals are different and have been modulated by signals having different bit rates.

U.S. Pat. No. 4,833,416 to Attwood discloses a demodulator including a pseudo data estimation loop for reducing loop gain variation.

None of the demodulators disclosed in this cited art is amenable to consolidation of the demodulator into a single chip having VLSI architecture, which adds to the expense of the demodulator and limits operating speed and increases power consumption. Furthermore, those devices in the prior art employing a digital FIR filter, operate on a fixed ratio between the input sample rate and filter output rate which limits demodulator efficiency and also limits symbol rate of the processing signal.

OBJECTS OF THE INVENTIONS

It is an object of this invention to provide a narrow band PSK demodulator.

It is another object that the demodulator of the invention be implemented on a single chip in VLSI architecture.

It is another object of this invention to provide a PSK demodulator which is suitable for high symbol rate operation or, alternatively, minimal power consumption with lower symbol rates.

It is another object of this invention to implement a unique digital filter that is embedded in the VLSI architecture which provides one output per symbol, indendent of the sample rate.

It is another object that the demodulator of this invention be suitable for high speed operation.

SUMMARY OF THE INVENTION

The present invention is directed toward a method and device in which a digital demodulator is implemented as a single integrated circuit suitable for high speed operation. Instead of employing a conventional digital FIR filter which requires a fixed ratio between the input sample rate and the filter output rate, a unique filter is disclosed which is an integral part of the demodulation process. By combining the demodulation process with the filtering process, the demodulator implementation becomes very efficient and is capable of processing signals with much higher symbol rates than otherwise possible, and with much lower power consumption for a given symbol rate.

The device includes a clocked multiplication circuit which produces a unfiltered baseband I component and an unfiltered baseband Q component. Each component is processed by one pair of two pairs of filters respectively.

Each pair of filters includes an on-time and an off-time filter. Each on-time filter is a low pass filter which provides the soft decision baseband information (I and Q) which are outputted for direct use. These signals are also used to control the timing of the symbol synchronization circuit.

Each pair of filters also includes an off-time filter whose coefficients are offset by ½ symbol period with respect to the on-time filters to produce outputs required to control symbol timing, enabling an indication of where that sample occurred with respect to the symbol boundaries. This enables the sample clock to operate at a fixed frequency.

BRIEF DESCRIPTION OF DRAWINGS

The novel features of the present invention may be better understood from the accompanying description when taken in conjunction with the accompanying drawings in which.

DETAILED DESCRIPTION OF A PREFERRED EMBODIMENT

Figure 1:
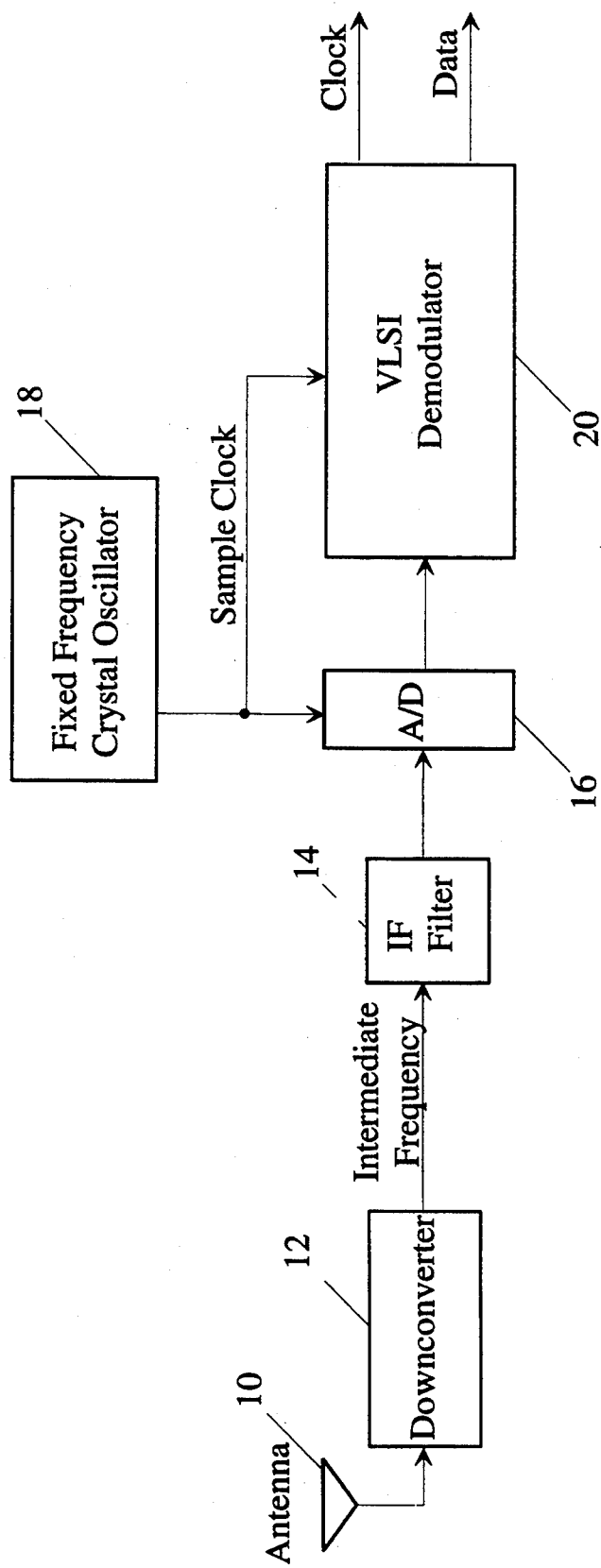
FIG. 1 illustrates the context of the VLSI demodulator in an overall digital receiver implementation.

The following paragraphs are a description of what I presently believe is the best mode for carrying out the invention. Turning now to a discussion of the drawings, FIG. 1 illustrates the overall block diagram of a digital data PSK receiver. The antenna 10 receives electromagnetic energy at a high frequency (i.e. Ku band for a typical satellite receiver) and provides a low level signal to the RF downconverter module 12. The RF downconverter 12 utilizes amplifiers, filters, mixers and local oscillators to amplify and translate the signal to a low frequency intermediate frequency (IF) such as 70 MHz. An IF filter 14 reduces the total bandwidth of the signal plus noise before it is applied to the analog-to-digital converter 16. The output of the A/D converter 16 is then applied to the VLSI demodulator 18 which performs the final digital conversion to baseband, the matched filtering of the signal, the carrier phase tracking and the symbol tracking. Both the A/D converter 16 and the VLSI demodulator 20 are docked with a fixed frequency crystal oscillator 18. The minimum frequency of the sample clock is two times the bandwidth of the IF filter 14 to avoid aliasing. The digitized signal out of the A/D converter 16 has a center frequency which is the frequency of the IF signal ($f_{IF}$) plus or minus n times the clock frequency ($f_C$), where n is the integer which provides the lowest possible digital center frequency.

Figure 2:
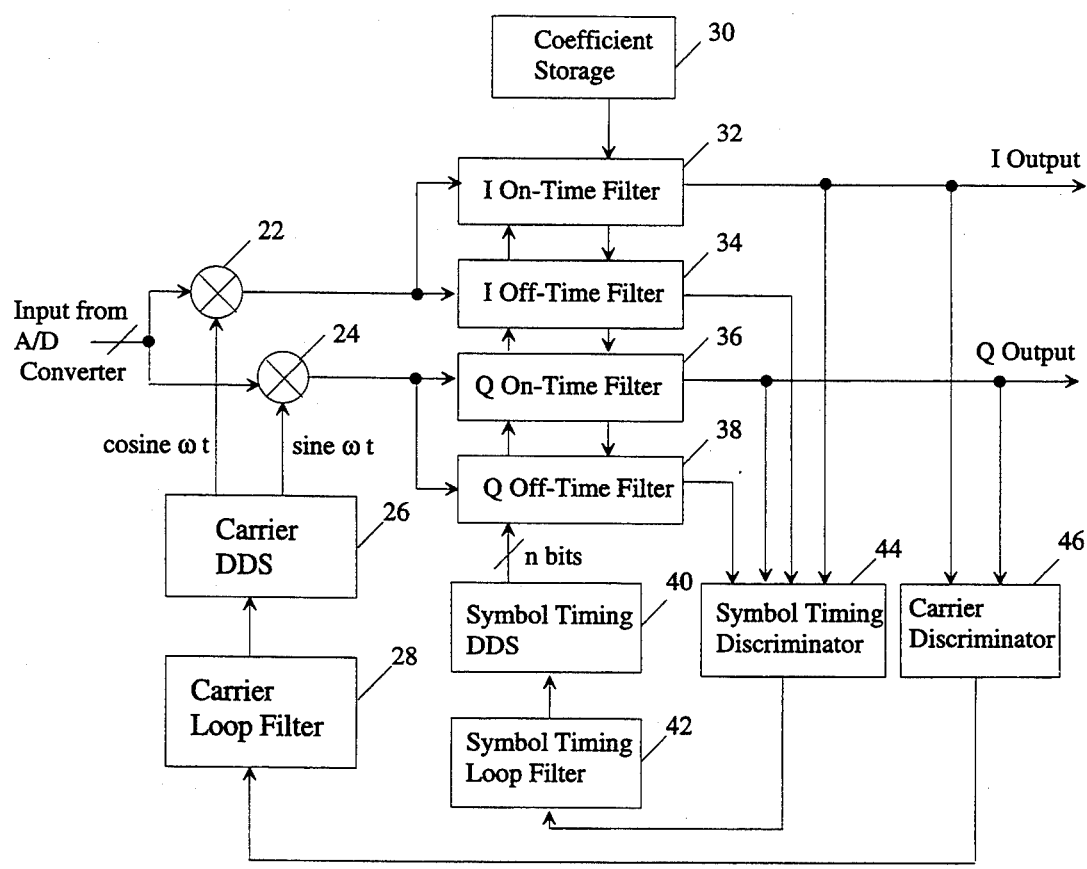
FIG. 2 illustrates the top level block diagram of the VLSI demodulator showing the information flow from one block to another.

FIG. 2 is the overall block diagram of the digital demodulator. The carrier tracking direct digital synthesizer (DDS) 26 is essentially a digital oscillator which is tuned to the center frequency of the digitized signal. This oscillator provides both a digital sine output and a digital cosine output. The incoming signal is multiplied 22 by the cosine out of the carrier DDS to produce the unfiltered baseband I component. The sine output from the DDS 26 is multiplied 24 with the incoming signal to produce the Q baseband component.

Four digital filters are required to process the baseband I and Q signals. The I on-time filter 32, and the Q on-time filter 36 are matched to the incoming signal with no time offset and each provides one output per symbol period. The output of these filters is the soft decision baseband information which may be used directly by the application, or may be forwarded to error correction processing depending upon system implementation. The two signals are adjusted to occupy an eight bit field to minimize the required logic. The eight bit field is selected such that clipping occurs infrequently. Both I and Q signals are applied to the carrier discriminator 46 which can implement a conventional automatic frequency control (AFC) algorithm during initial acquisition for either QPSK or BPSK to remove coarse frequency error. During steady state, the carrier discriminator 46 performs a conventional phase tracking algorithm to permit the demodulator to operate coherently. The output of the discriminator is applied to the carrier loop filter block 28. The carrier loop is closed by providing the output of the carrier loop filter 28 to the carrier tracking DDS 26.

The symbol tracking function requires two additional digital filters which have the same frequency characteristics. The I off-time filter 34 and the Q off-time filter 38 also provide one output per symbol. However, the coefficients of these two filters are offset by ½ symbol period with respect to the on-time filters to provide outputs which are centered in time exactly between optimum sampling points. These outputs are required for the symbol timing discriminator 44 along with the on-time outputs. The symbol timing discriminator 44 utilizes an algorithm described by B. Farhang-Boroujeny entitled "Near Optimum Timing Recovery for Digitally Implemented Data Receivers", published in the September 1990 (Vol. 38, No. 9) issue of the IEEE Transactions on Communications which is hereby incorporated as a reference in this specification. This algorithm only requires the on-time samples and off-time samples as inputs and can be implemented with sampling rates approaching 2 samples-per-symbol when asynchronous sampling is employed as is the case with this invention. The output of the symbol timing discriminator 44 is applied to the symbol timing loop filter 42. The symbol timing loop is closed by applying the output of the symbol timing loop filter 42 to the symbol timing tracking DDS 40.

A major feature of this invention is that the symbol tracking DDS 40 provides multiple phase bits to each of the filters. At each sample instant, the symbol tracking DDS 40 provides a digital measure of where that sample occurred with respect to the symbol boundaries. Also provided at each sample clock to the filters by the symbol tracking DDS 40 is a three bit symbol counter status. The bit count status and the symbol phase information is used by each of the filters to select the correct coefficients from the coefficient storage 30 for that particular sample.

The advantage of this approach is that the sample clock is fixed frequency and asynchronous with respect to the symbol timing. This results in lower implementation costs because a fixed frequency timing source is much simpler than a tunable source. It also results in better performance because the phase noise of a fixed frequency oscillator is inherently superior to that of a tunable source.

Figure 3:
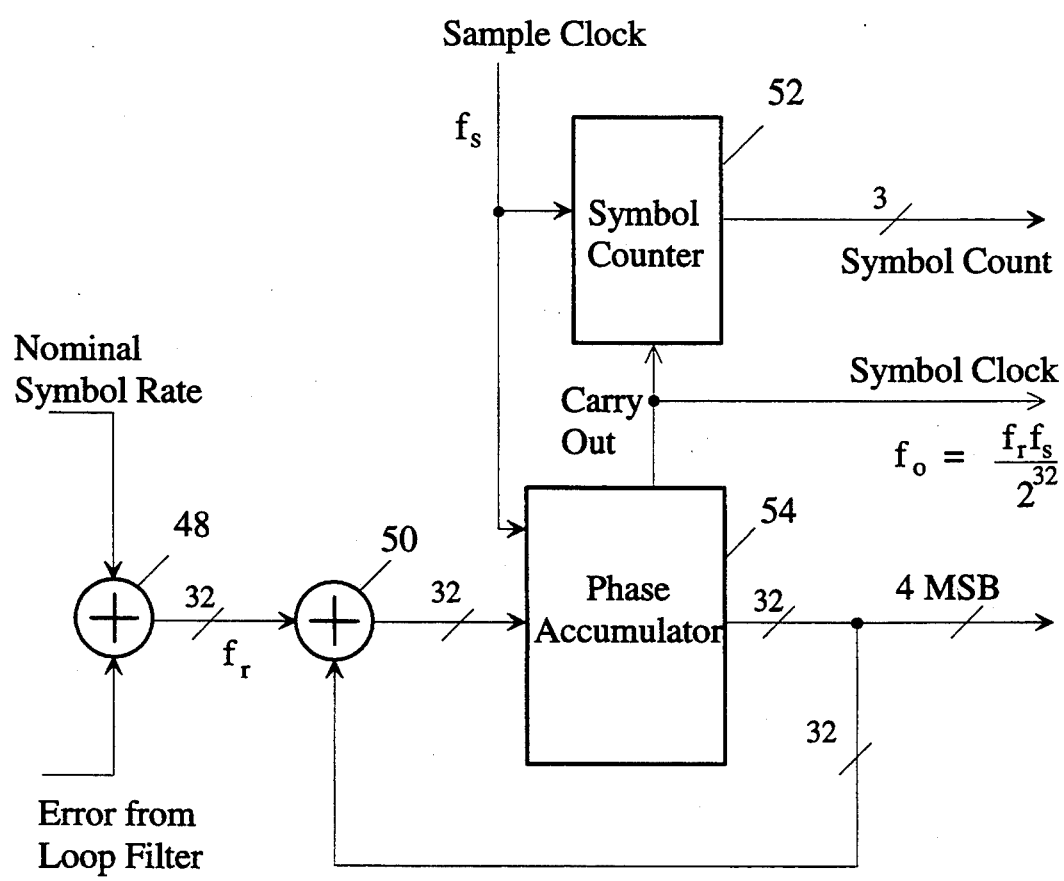
FIG. 3 illustrates the direct digital synthesizer (DDS) utilized in the symbol tracking phase locked loop along with the three bit symbol counter.

FIG. 3 illustrates the symbol tracking DDS 40 concept in more detail. The adder 50 and phase accumulator 54 represent a conventional 32 bit DDS. The 32 bit number $f_r$ controls the frequency of the DDS. At each sample clock, the number $f_r$ is added to the phase accumulator. The output of the phase accumulator will appear as a ramp function. When the output overflows the 32 bit field, the ramp starts a new cycle. The frequency of the ramp function is directly proportional to the sample clock frequency and the control number $f_r$. In the symbol timing function, the number $f_r$ is composed of two elements, the nominal symbol rate and the error signal from the symbol timing loop filter. These two components are added together in the adder 48.

For the embodiment of the invention which is illustrated, only the most significant 4 bits of the 32 bit phase accumulator 54 have significance to the filter. The phase accumulator rolls over at the beginning of a new symbol period and the carry out of the phase accumulator 54 goes true for one sample clock period. This carry out signal becomes the symbol clock to the digital filters. The carry out also increments a three bit symbol counter 52, which is needed by the filters for timing and control.

Figure 4:
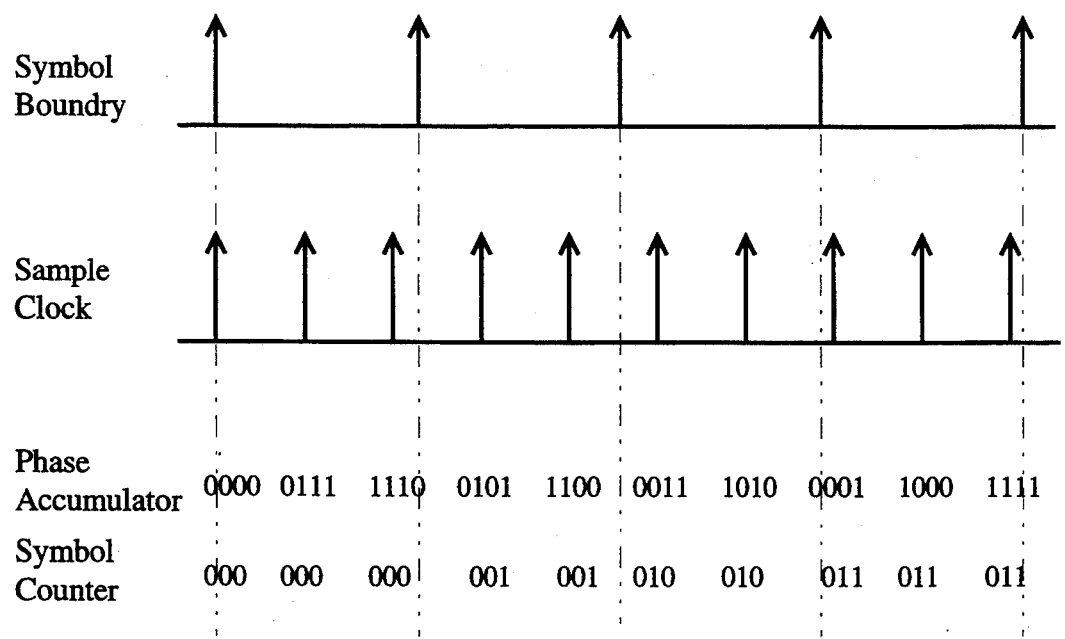
FIG. 4 illustrates the phase output of the DDS when the fixed frequency sample clock is not an integer harmonic of the symbol clock.

FIG. 4 illustrates the concept of a fixed symbol timing which is sampled with an asynchronous clock. For this example, the sample clock is nominally 16/7 of the symbol clock. For ease of illustration, the two timing functions are illustrated starting off in-phase. The four bit numbers represent the value of the phase accumulator 54 at each sample clock. The three bit numbers illustrate the output of the bit counter 52.

Figure 5:
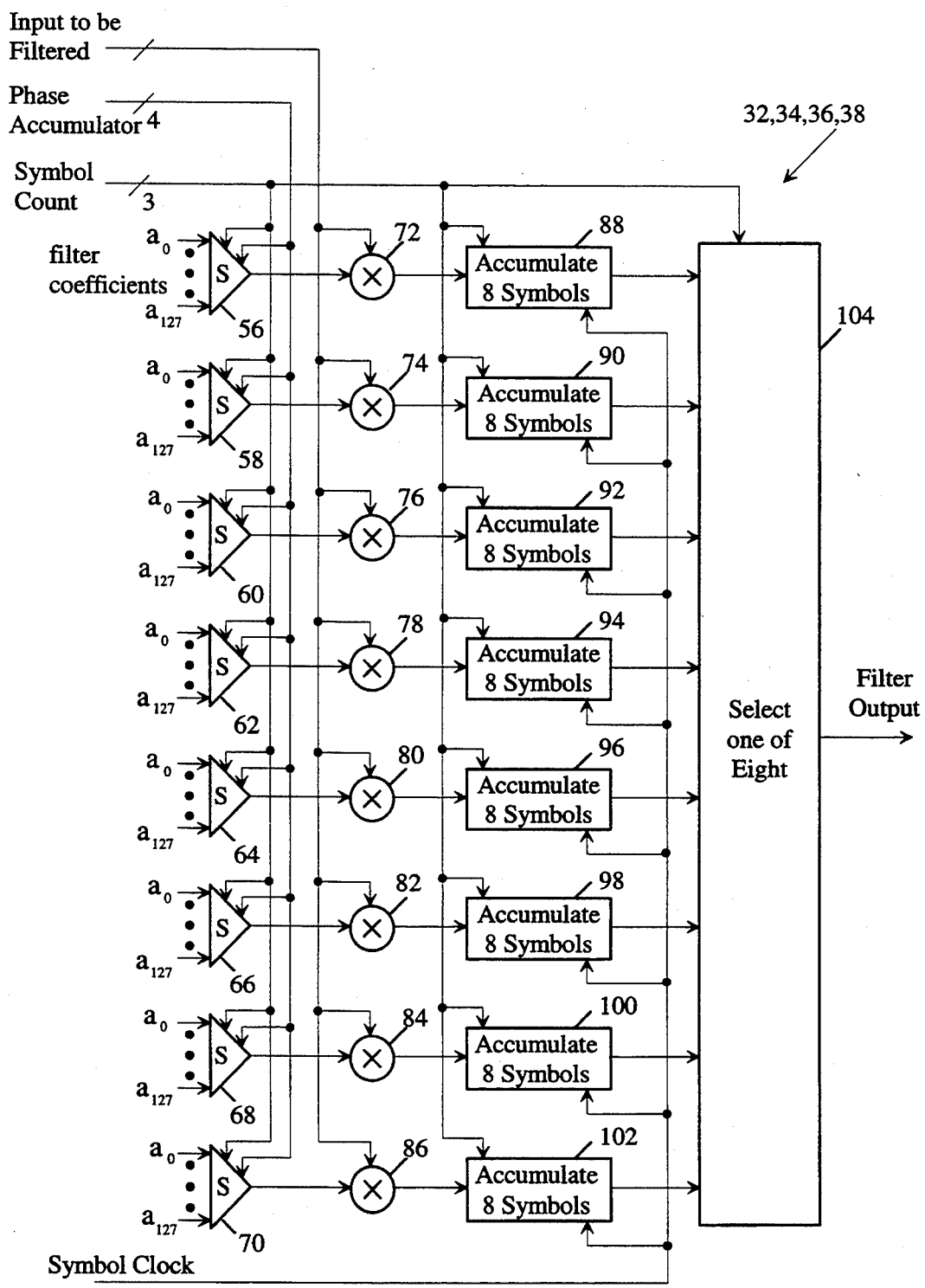
FIG. 5 illustrates one of the four digital filters required for the demodulator and how eight different multiplier/accumulators are utilized to implement a filter which covers a time span of eight symbols and provides one output every symbol period.

FIG. 5 illustrates the logic within each of the filters (32 through 38) of FIG. 2. The filter spans a total of 8 symbols with one output for each symbol. This is implemented with eight separate multiplier accumulators. At each symbol time, one multiplier-accumulator dumps its output into a holding register and begins a new cycle. The select one-of-eight function 104 provides the held output of that one accumulator which initiated a new cycle as the filter output for that symbol time. Over eight symbol times, each multiplier accumulator is selected once as the filter output.

The input from the A/D converter is provided simultaneously to all eight multipliers (72 through 86). The filter coefficients are provided simultaneously to all the select functions (56 through 70). For the described embodiment, there are 4 bits of phase information used, or 16 coefficients for each of the eight symbols of the filter. This could represent a total of 128 coefficients. However, if the filter is assumed to be symmetrical in time, then only 64 different coefficients are necessary. Furthermore, it is possible to reduce the time resolution of the coefficients away from the main lobe. Using this technique, a total of 32 coefficients can be used with little loss in performance over the ideal filter with 128 coefficients.

The selectors (56 through 70) accept as input the 3 bit symbol count information and the 4 bit phase information. These seven bits determine which of the (up to) 128 coefficients are to be selected for the eight multiplier accumulators. The eight select functions (56 through 70) select coefficients for filters which are separated in time by discrete symbol periods. At any sample clock instant, it is likely that the eight coefficients selected are all different. The outputs of each of the eight multipliers (72 through 86) are accumulated by eight independent accumulators (88 through 102). When a symbol clock occurs, the multiplier accumulator which has accumulated 8 symbols worth of information will dump its contents into a holding register and begin a new accumulation period.

Figure 6:
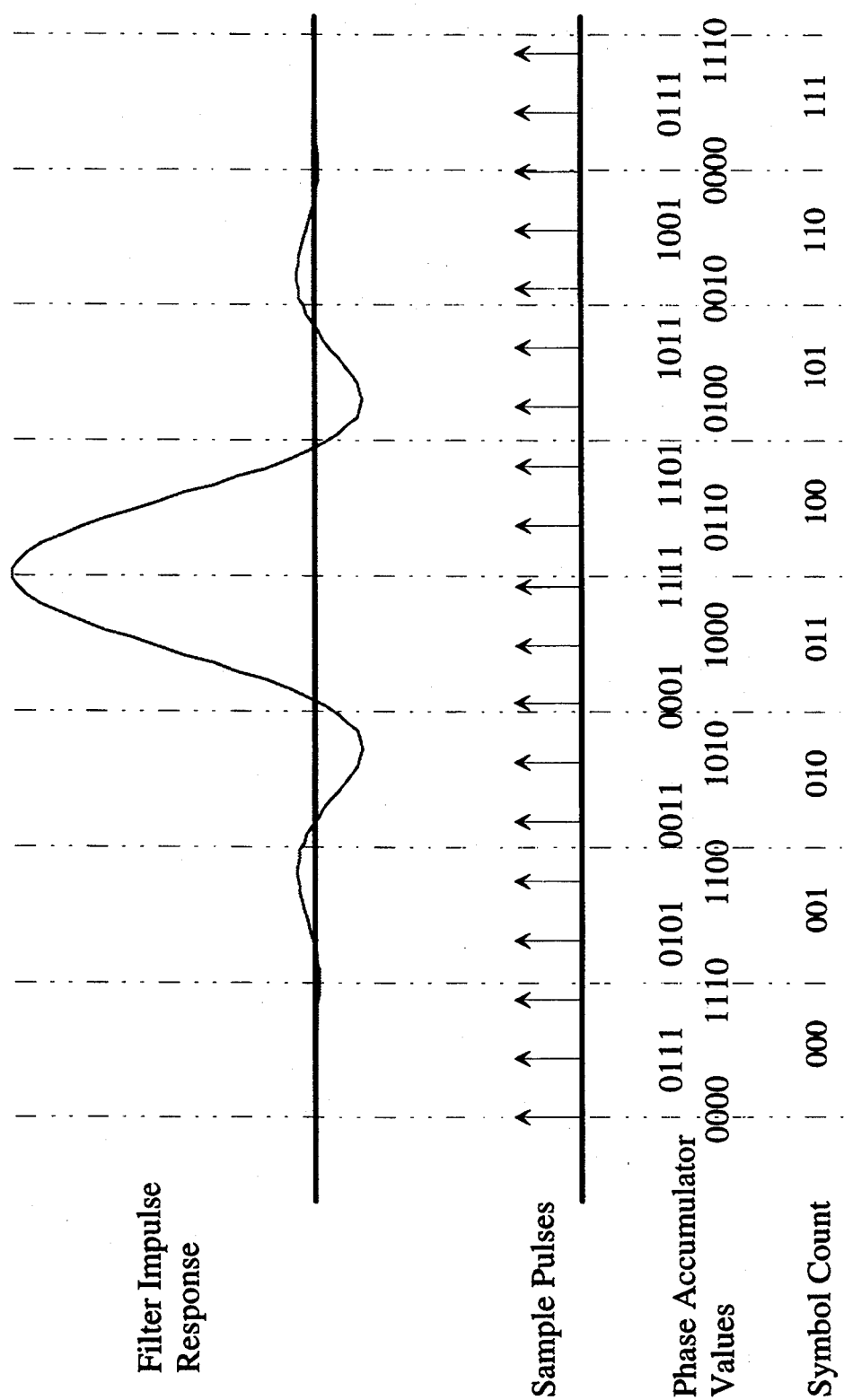
FIG. 6 illustrates the technique for selecting filter coefficients when an asynchronous sampling clock is used utilizing the timing presented in FIG. 4 as an example.

FIG. 6 illustrates the shape of a typical filter used for a narrowband demodulator. The filter spans a total of eight symbols and the three bit symbol count is shown. As an example, the sampling clock is selected to be consistent with that presented in FIG. 4. The timing of the sampling clock and the phase accumulator output for each sample pulse is illustrated at the bottom of FIG. 6. For this example, a total of 19 sample clocks are present during the accumulation period. Using the filter implemented by select 56, multiplier 72 and accumulator 88 as an example, the accumulator 88 would add 19 samples together before saving the output and beginning a new accumulation period. The coefficients provided by the select 56 function can be found by determining the 19 filter coefficients which correspond with the 19 sample pulses in FIG. 6

The forgoing description illustrates the invention by example and is not intended to define the scope or the invention. Variations of the invention may be considered which are within the scope of the invention. For example, the filters may have a different number of coefficients. The principle of selecting a coefficient for each sampling pulse as a function of its phase location in the symbol period may be applied to a usage where the sampling pulses are entirely random. The impulse response of the filters may extend more or less than eight symbol cycles. I therefore wish to define the scope of my invention by the appended claims.

I claim:

1. A phase shift keyed demodulator, comprising:
   (a) a fixed frequency sampling clock,
   (b) an analog to digital converter, which is clocked with said fixed frequency sampling clock, which produces a succession of digital samples of a bandlimited phase shift keyed signal, said bandlimited phase shift keyed signal consisting of a sequence of symbols, occurring at a periodic symbol rate which is asynchronous with respect to said fixed frequency sampling clock,
   (c) a means of frequency translating said succession of digital samples of a bandlimited phase shift keyed signal to approximately zero carrier frequency to produce a succession of baseband signal samples consisting of an in-phase component and a quadrature component,
   (d) a symbol tracking means which includes a symbol timing numerically controlled oscillator capable of providing a symbol timing phase value at each sampling instant of said fixed frequency sampling clock,
   (e) a symbol counter which produces a symbol count value which is incremented once every symbol period,
   (f) a plurality of finite impulse response filters which produce a plurality of filtered outputs at said periodic symbol rate in response to said succession of baseband samples, said symbol count value and said symbol timing phase value,
   (g) said symbol tracking means which produces a frequency correction signal to be applied to said symbol timing numerically controlled oscillator in response to said plurality of filtered outputs.

2. A demodulator as in claim 1 which employs a digital carrier tracking loop further comprising:
   (a) said frequency translating means comprising a set of two multipliers, each of which accept said succession of digital samples and produce said succession of baseband signal samples consisting of said in-phase component and said quadrature component,
   (b) a finite impulse response filter which accepts said in-phase component and produces a filtered in-phase component,
   (c) a finite impulse response filter which accepts said quadrature component and produces a filtered quadrature component,
   (c) a carrier numerically controlled oscillator which produces a sine signal and a cosine signal which are applied to said frequency translating means,
   (d) a carrier discriminator which accepts said filtered in-phase component and said filtered quadrature component and produces a carrier error signal which is proportional to carrier phase or frequency error of said phase shift keyed signal,
   (e) a carrier loop filter which accepts said carrier error signal and produces a frequency control signal which is applied to said carrier numerically controlled oscillator.

3. A demodulator as in claim 1 which is suitable for processing binary phase shift keyed signals and quadrature phase shift keyed signals.

4. A demodulator as in claim 1 which employs a method of deriving symbol timing error described by B. Farhang-Boroujeny in the September 1990 issue of the IEEE Transactions on Communications.

5. A demodulator as in claim 1 wherein said plurality of finite impulse response filters each utilizes a plurality of filter coefficients which comprises,
   (a) a plurality of select functions which accept said plurality of filter coefficients and produce a plurality of selected coefficients at each sampling instant of said fixed frequency sampling clock in response to said symbol count value and said symbol timing phase value,
   (b) a plurality of multiplier functions which accept said succession of baseband samples and said plurality of selected coefficients to produce a plurality of products,
   (c) a plurality of accumulators which accept as input, said plurality of products and produce a plurality of accumulated results,
   (d) an output select function which accepts said plurality of accumulated results to produce a filter output in response to said symbol count value.

6. A demodulator in accordance with claim 5 wherein said plurality of finite impulse response filters can be configured to produce an optimally timed output or an offset output which is one half symbol offset from optimal timing by modifying the means of selection of coefficients.

7. A demodulator as in claim 1 which is capable of demodulation of said bandlimited phase shift keyed signal utilizing said fixed frequency sampling clock with a clock frequency at close to two times said limited signal bandwidth comprising,
   (a) one of said finite impulse response filters which accept said in-phase component and produces an on time in-phase output,
   (b) one of said finite impulse response filters which accept said in-phase component and produces an off time in-phase output,
   (c) one of said finite impulse response filters which accept said quadrature component and produces an on time quadrature output,
   (d) one of said finite impulse response filters which accept said quadrature component and produces an off time quadrature output,
   (e) said symbol tracking means which accepts said on time in-phase output, said off time in-phase output, said on time quadrature output, and said off time quadrature output and produces said frequency correction signal to be applied to said symbol timing numerically controlled oscillator.

8. A demodulator as in claim 7 which is capable of demodulating said bandlimited phase shift keyed signal utilizing said fixed frequency sampling clock with the clock frequency at several hundred times or more than said limited signal bandwidth.

9. A demodulator as in claim 8 which processes a selected one bandlimited phase shift keyed signal when many said band limited phase shift keyed signals are present with different carrier frequencies in said succession of digital samples, comprising,
- (a) said carrier numerically controlled oscillator,
- (b) said frequency translating means,
- (c) a means of controlling the nominal center frequency of said carrier numerically controlled oscillator to correspond to the carrier frequency of said selected one bandlimited phase shift keyed signal.

10. A finite impulse response filter which utilizes a plurality of filter coefficients, which is capable of providing a filtered output at a constant output rate, which accepts a succession of baseband signal samples at an input sample rate which is asynchronous with respect to said constant output rate, consisting of,
- (a) a symbol timing numerically controlled oscillator which is clocked with a fixed frequency sampling clock and provides a fundamental output frequency at said constant output rate and consists of a phase accumulator which provides a symbol timing phase value at each clock period,
- (b) a symbol counter which provides a symbol count value which is incremented each time said phase accumulator advances to a new symbol,
- (c) a plurality of select functions which accept a plurality of filter coefficients as input and provide a plurality of selected coefficients in response to said symbol timing phase value and said symbol count value,
- (d) a plurality of multiplier functions which accept as input said succession of baseband signal samples and said plurality of selected coefficients to produce a plurality of products,
- (e) a plurality of accumulators which accept said plurality of products and produce a plurality of intermediate filtered outputs,
- (f) an output select function which accepts said plurality of intermediate filtered outputs and produces said filtered output in response to said symbol count value.

* * * * *